United States Patent
Yang et al.

(10) Patent No.: US 11,362,857 B2
(45) Date of Patent: Jun. 14, 2022

(54) MESSAGE PROCESSING METHOD, APPARATUS, ELECTRONIC CONTROL UNIT AND READABLE STORAGE MEDIUM

(71) Applicant: Apollo Intelligent Driving Technology (Beijing) Co., Ltd., Beijing (CN)

(72) Inventors: Kai Yang, Beijing (CN); Hongda Zhang, Beijing (CN); Qijuan Yin, Beijing (CN); Wuzhao Zhang, Beijing (CN); Baisheng Wang, Beijing (CN); Zhuo Chen, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 219 days.

(21) Appl. No.: 16/505,826

(22) Filed: Jul. 9, 2019

(65) Prior Publication Data
US 2020/0076642 A1 Mar. 5, 2020

(30) Foreign Application Priority Data
Aug. 30, 2018 (CN) .......................... 201811001612.7

(51) Int. Cl.
*H04L 12/40* (2006.01)
*H04L 12/08* (2006.01)

(52) U.S. Cl.
CPC .......... *H04L 12/4015* (2013.01); *H04L 12/08* (2013.01); *H04L 2012/40215* (2013.01); *H04L 2012/40273* (2013.01)

(58) Field of Classification Search
CPC ................. H04L 12/4015; H04L 12/08; H04L 2012/40273; H04L 2012/40215
See application file for complete search history.

(56) References Cited

U.S. PATENT DOCUMENTS 9,231,936 B1 * 1/2016 Wang ....................... H04L 63/12
9,705,678 B1 * 7/2017 Wang ................... H04L 63/1466
(Continued)

FOREIGN PATENT DOCUMENTS

| CN | 104301177 A | 1/2015 |
| CN | 105278413 A | 1/2016 |

(Continued)

OTHER PUBLICATIONS

Office Action regarding Chinese Patent Application No. 201811001612.7, dated Aug. 28, 2020.

*Primary Examiner* — Rasheed Gidado
(74) *Attorney, Agent, or Firm* — Harness, Dickey & Pierce, P.L.C.

(57) ABSTRACT

Provided are a message processing method, an apparatus, an electronic control unit, and a readable storage medium. The method includes configuring different sending times for any two different electronic control units corresponding to the same message ID in sending time configuration information of electronic control units; and when sending messages to a CAN bus, sending, by the electronic control units, the messages to the CAN bus at available sending times according to corresponding sending time configuration information, so that the time for any two different electronic control units corresponding to the same message ID to send messages to the CAN bus is separated. The method can improve the safety of the unmanned system.

18 Claims, 3 Drawing Sheets

Obtaining, by an electronic control unit, corresponding sending time configuration information, when sending a message to a CAN bus — S101

Sending, by the electronic control unit, the message to the CAN bus at an available sending time, according to the sending time configuration information — S102

(56) References Cited

U.S. PATENT DOCUMENTS

| | | | | |
|---|---|---|---|---|
| 9,794,286 | B2* | 10/2017 | Otsuka | H04L 63/1416 |
| 10,215,145 | B2* | 2/2019 | Perez | B60R 16/023 |
| 10,708,248 | B2* | 7/2020 | Kim | H04L 63/062 |
| 2012/0140861 | A1* | 6/2012 | Menon | H04L 12/403 |
| | | | | 375/356 |
| 2014/0328352 | A1* | 11/2014 | Mabuchi | H04L 12/4035 |
| | | | | 370/451 |
| 2015/0063371 | A1* | 3/2015 | Horvath | H04L 47/805 |
| | | | | 370/461 |
| 2016/0205194 | A1* | 7/2016 | Kishikawa | H04L 63/10 |
| | | | | 726/1 |
| 2016/0344552 | A1 | 11/2016 | Sharma | |
| 2017/0324675 | A1* | 11/2017 | Takada | H04L 12/40026 |
| 2018/0152315 | A1* | 5/2018 | Kurauchi | H04L 67/12 |
| 2018/0290556 | A1* | 10/2018 | Demont | H04L 12/4035 |
| 2019/0155662 | A1* | 5/2019 | Kuno | G06F 9/5083 |

FOREIGN PATENT DOCUMENTS

| | | |
|---|---|---|
| CN | 107534560 A | 1/2018 |
| CN | 108306785 A | 7/2018 |

\* cited by examiner

MESSAGE PROCESSING METHOD, APPARATUS, ELECTRONIC CONTROL UNIT AND READABLE STORAGE MEDIUM

CROSS-REFERENCE TO RELATED APPLICATIONS

This application claims priority to Chinese Patent Application No. 201811001612.7, filed on Aug. 30, 2018, entitled "Message Processing Method, Apparatus, Electronic Control Unit, and Readable Storage Medium", which is incorporated herein by reference in its entirety.

TECHNICAL FIELD

Embodiments of the present disclosure relate to the field of communication technologies, and in particular, to a message processing method, an apparatus, an electronic control unit, and a readable storage medium.

BACKGROUND

The traditional Controller Area Network (CAN bus for short) is a network for local real-time control. It prevails in vehicles, intelligent buildings and industrial fields, is one of the most widely used field buses in the world, and is currently one of the industry standards especially in the automobile field.

In an unmanned system, a plurality of electronic control units (ECUs) of the unmanned system communicate via a CAN bus. The message sent by the electronic control unit to the CAN bus mainly contains the following information: a message ID, a data length field and a data domain. When the CAN bus is idle, any electronic control unit can send a message to the CAN bus. When two or more electronic control units simultaneously send messages to the CAN bus, a message with the smallest message ID is sent first based on a CAN bus competition mechanism, and sending of the remaining messages is delayed until the CAN bus is idle again.

In order to improve the safety of the unmanned system, the plurality of electronic control units in the unmanned system all have an authority to send a control instruction message such as a brake instruction and a parking instruction to the CAN bus, so as to control the unmanned vehicle to brake or parking in the case that other electronic control units fail. In some cases, when a plurality of electronic control units simultaneously send messages of the same instruction to the CAN bus, a plurality of messages with the same message IDs are simultaneously sent to the CAN bus, and the message IDs of the plurality of messages conflict, causing these messages to be discarded, following a result that control instructions, such as the braking instruction, the parking instruction, etc., sent by these electronic control units are not executed by the vehicle, which can easily cause serious accidents in unmanned vehicles, and is of a great security risk.

SUMMARY

The embodiments of the present disclosure provide a message processing method, an apparatus, an electronic control unit, and a readable storage medium, which are used to solve the problem existed in the prior art that when a plurality of electronic control units simultaneously send messages of the same instruction to the CAN bus, a plurality of messages with the same message IDs are simultaneously sent to the CAN bus, and the message IDs of the plurality of messages conflict, causing these messages to be discarded, following a result that control instructions, such as the braking instruction, the parking instruction, etc., sent by these electronic control units are not executed by the vehicle, which can easily cause serious accidents in unmanned vehicles, and is a great security risk.

One aspect of the embodiments of the present disclosure provides a message processing method, including:

obtaining, by an electronic control unit, corresponding sending time configuration information when sending a message to a CAN bus, where the sending time configuration information is used to determine an available sending time when the electronic control unit sends the message to the CAN bus, and available sending times when any two different electronic control units corresponding to the same message ID send messages to the CAN bus are different; and sending, by the electronic control unit, the message to the CAN bus at the available sending time according to the sending time configuration information.

Another aspect of the embodiments of the present disclosure provides a message processing apparatus, including:

a configuration information obtaining module configured to: obtain, by an electronic control unit, corresponding sending time configuration information when sending a message to a CAN bus, where the sending time configuration information is used to determine an available sending time when the electronic control unit sends the message to the CAN bus, and available sending times when any two different electronic control units corresponding to the same message ID send messages to the CAN bus are different; and a message sending module configured to send, by the electronic control unit, the message to the CAN bus at the available sending time according to the sending time configuration information.

Still another aspect of the embodiments of the present disclosure provides an electronic control unit, including:

a memory, a processor, and a computer program stored on the memory and runnable on the processor, the above method is implemented when the processor runs the computer program.

Yet another aspect of the embodiments of the present disclosure provides a computer readable storage medium storing a computer program, the above method is implemented when the computer program is executed by a processor.

The message processing method, the apparatus, the electronic control unit, and the readable storage medium provided by the embodiments of the present disclosure involve configuring different sending times for any two different electronic control units corresponding to the same message ID in sending time configuration information of electronic control units; obtaining, by the electronic control units, the corresponding sending time configuration information when sending messages to a CAN bus; and sending the messages to the CAN bus at available sending times according to the sending time configuration information so as to make the time for sending, by any two different electronic control units corresponding to the same message ID, messages to the CAN bus separated, which can avoid the case that different electronic control units send messages with the same message ID to CAN bus at the same time and thus avoid message IDs of a plurality of messages on the CAN bus conflict, thereby avoiding a serious accident of an unmanned vehicle caused by control instructions such as a brake instruction and a parking instruction sent by an electronic control unit not to be executed by the vehicle due to the conflict of the message IDs of the plurality of messages on the CAN bus, and improving the safety of the unmanned system.

The embodiments of the present disclosure have been shown in the foregoing drawings and will be described in detail below. The drawings and descriptions illustrate the concepts of the present disclosure to the skilled in the field by reference to specific embodiments, rather than limiting the scope of the ideas of the embodiments of the present disclosure in any way.

DESCRIPTION OF EMBODIMENTS

Exemplary embodiments will be described in detail herein, and examples thereof are illustrated in the accompanying drawings. When the following description refers to the drawings, the same number in different drawings represents the same or similar element unless otherwise indicated. The implementations described in the following exemplary embodiments do not represent all implementations consistent with the embodiments of the present disclosure. Instead, they are merely examples of apparatuses and methods consistent with some aspects of the embodiments of the present disclosure as detailed in the appended claims.

First, nouns involved in the embodiments of the present disclosure are explained:

the traditional Controller Area Network (CAN bus for short): it is a network for local real-time control. It prevails in vehicles, intelligent buildings and industrial fields, is one of the most widely used field bus in the world, and is currently one of the industry standards especially in the automobile field.

Moreover, terms "first", "second", and the like are used for the purpose of description only, and are not to be construed as indicating or implying a relative importance or implicitly indicating the number of technical features indicated. In the description of the following embodiments, the meaning of "a plurality of" refers to two or more unless specifically defined otherwise.

Following several specific embodiments may be combined with each other, and the same or similar concepts or processes may not be described again in some embodiments. The embodiments of the present disclosure will be described below with reference to the accompanying drawings.

Embodiment I

Figure 1:
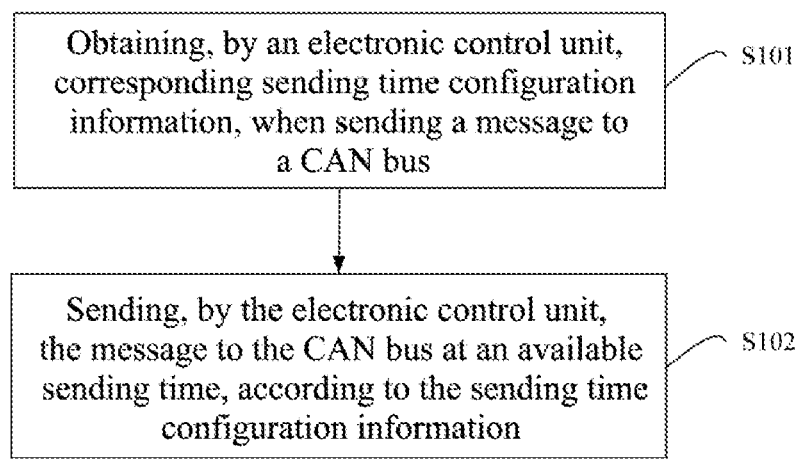
FIG. 1 is a flowchart of a message processing method according to Embodiment I of the present disclosure.

FIG. 1 is a flowchart of a message processing method according to Embodiment I of the present disclosure. The embodiments of the present disclosure provide a message processing method in view of the problem in the art that when a plurality of electronic control units simultaneously send messages of the same instruction to a CAN bus, a plurality of messages with the same message ID are simultaneously sent to the CAN bus, and the message IDs of the plurality of messages conflict, causing these messages to be discarded, following a result that all control instructions such as a braking instruction and a parking instruction sent by these electronic control units are not executed by an unmanned vehicle, which can easily cause serious accidents of the unmanned vehicle, and is a great security risk.

The method in this embodiment is applied to an electronic control unit for sending a message to the CAN bus in an unmanned system. For example, an electronic control unit corresponding to a brake system and for sending a message corresponding to a brake instruction to the CAN bus; an electronic control unit corresponding to a parking system and for sending a message corresponding to a parking instruction to the CAN bus, etc., and this embodiment will not enumerate it one by one.

In an unmanned system, a brake system includes an electronic control unit for sending a message corresponding to a brake instruction to a CAN bus; a safety control system has an authority to send a brake instruction to the vehicle when certain failures of the unmanned system are detected, the safety control system includes an electronic control unit for sending a message corresponding to the brake instruction to the CAN bus, and the two electronic control units can send messages with the same message ID corresponding to the brake instruction to the CAN bus. In the unmanned system, there are a plurality of other electronic control units that can send messages with the same message ID to the CAN bus, this embodiment will not enumerate them one by one.

In this embodiment, different sending times may be set for a plurality of electronic control units corresponding to the same message ID, thereby preventing the plurality of electronic control units from simultaneously sending messages having the same message ID to the CAN bus.

As shown in FIG. 1, specific steps of the method are as follows:

Step 101: obtaining, by an electronic control unit, corresponding sending time configuration information, when sending a message to a CAN bus.

Where the sending time configuration information is used to determine an available sending time when the electronic control unit sends the message to the CAN bus. Any two different electronic control units corresponding to the same message ID have different available sending times when sending messages to the CAN bus. Where the sending time refers to a moment at which the electronic control units send the messages to the CAN bus.

Optionally, the sending time configuration information corresponding to each electronic control unit may be pre-stored in the electronic control unit.

Optionally, a central control device may send the sending time configuration information corresponding to each electronic control unit to each electronic control unit, and the electronic control unit receives and stores the sending time configuration information that corresponds to the electronic control unit and is sent thereto by the central control device.

Where the central control device may be a specially-established device for receiving the sending time configuration information input by a technician and sending the sending time configuration information to the electronic control unit. This embodiment will not specifically limit it.

In this step, the electronic control unit may obtain the pre-stored sending time configuration information.

Step 102: sending, by the electronic control unit, the message to the CAN bus at an available sending time, according to the sending time configuration information.

In this embodiment, different sending times are assigned to electronic control units corresponding to the same message ID, and when the electronic control units send messages to the CAN bus, they send the messages to the CAN bus at available sending times according to the corresponding sending time configuration information, so that the time for these electronic control units sending messages to the CAN bus is separated, which can prevent different electronic control units from simultaneously sending messages with the same message ID to the CAN bus.

For example, the electronic control unit of a brake system in an unmanned system of an unmanned vehicle can send a message corresponding to a brake instruction to the CAN bus. The unmanned vehicle may also include a safety control system, which is used for controlling working states of other parts of the unmanned system, and can send the message corresponding to the brake instruction to the CAN bus when the other parts of the unmanned system seriously fail. Then, the sending time of the electronic control unit of the brake system can be the 10th millisecond, 30th millisecond and 50th millisecond in one second; the sending time of the electronic control unit of the safety control system can be the 20th millisecond, 40th millisecond and 60th millisecond in one second. In this way, the electronic control unit of the brake system sends messages to the CAN bus at the 10th millisecond, 30th millisecond and 50th millisecond in one second and the electronic control unit of the safety control system sends messages to the CAN bus at the 20th millisecond, 40th millisecond and 60th millisecond in one second, which ensures that the electronic control unit of the brake system and the electronic control unit of the safety control system send messages to the CAN bus at different sending times.

This embodiment of the present disclosure involves configuring different sending times for any two different electronic control units corresponding to the same message ID in sending time configuration information of electronic control units; obtaining, by the electronic control units, corresponding sending time configuration information when sending messages to a CAN bus; and sending the messages to the CAN bus at available sending times according to the sending time configuration information so that the time for sending, by any two different electronic control units corresponding to the same message ID, messages to the CAN bus is separated, which can avoid the case that different electronic control units send messages with the same message ID to the CAN bus at the same time, and thus avoid the case in which message IDs of a plurality of messages on the CAN bus conflict, thereby avoiding a serious accident of an unmanned vehicle caused by control instructions such as a brake instruction and a parking instruction sent by an electronic control unit not being executed by the vehicle as the result of the conflict of the message IDs of the plurality of messages on the CAN bus, and improving the safety of an unmanned system.

Embodiment II

Figure 2:
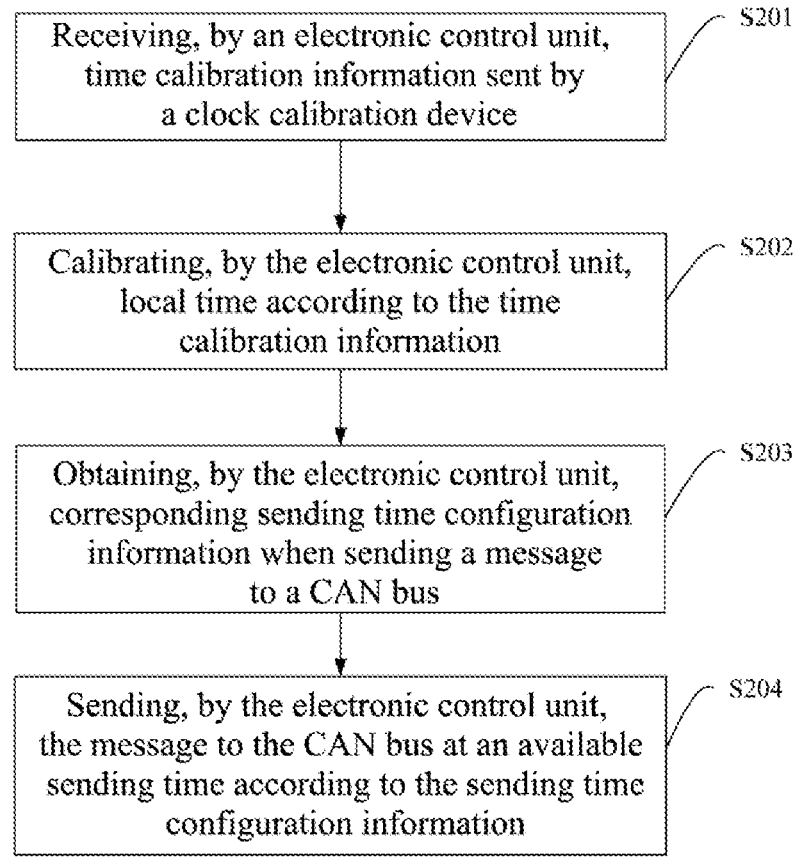
FIG. 2 is a flowchart of a message processing method according to Embodiment II of the present disclosure.

FIG. 2 is a flowchart of a message processing method according to Embodiment II of the present disclosure. On the basis of the above Embodiment I, in this embodiment, before the electronic control unit obtains the sending time configuration information before sending the message to the CAN bus, the method further includes: receiving, by the electronic control unit, time calibration information sent by the central control device; and calibrating, by the electronic control unit, local time according to the time calibration information. As shown in FIG. 2, the specific steps of the method are as follows:

Step 201: receiving, by an electronic control unit, time calibration information sent by a clock calibration device.

In this embodiment, when an unmanned system is initialized, the local time of a plurality of electronic control units corresponding to the same message ID is calibrated to synchronize the time of the plurality of electronic control units corresponding to the same message ID.

Specifically, the time calibration information may be sent by the clock calibration device to the plurality of electronic control units corresponding to the same message ID. Each electronic control unit receives time calibration information sent by the clock calibration device so as to calibrate the local time according to the time calibration information.

Optionally, when the unmanned system is initialized, the local time of all electronic control units can be calibrated to synchronize the time of all electronic control units.

Step 202: calibrating, by the electronic control unit, local time according to the time calibration information.

Optionally, the time calibration information includes sending time stamp information. After receiving the time calibration information sent by the clock calibration device, the electronic control unit calibrates the local time according to the sending time stamp information.

In this embodiment, the local time of the plurality of electronic control units corresponding to the same message ID is calibrated, so that the local time of the plurality of electronic control units corresponding to the same message ID is the same. This can be implemented by a method of time calibration and synchronization in the prior art, which will not be repeated in this embodiment.

Step 203: obtaining, by the electronic control unit, corresponding sending time configuration information when sending a message to a CAN bus.

Where the sending time configuration information is used to determine the available sending time when the electronic control unit sends the message to the CAN bus, and the time available when any two different electronic control units corresponding to the same message ID send messages to the CAN bus is different.

In this embodiment, the sending time configuration information corresponding to the electronic control unit includes a time offset corresponding to the electronic control unit.

Where the time offset corresponding to the electronic control unit refers to the time offset of a first available sending time when the electronic control unit sends the message to the CAN bus within one clock unit from a start time of the clock unit.

Where time offsets corresponding to any two different electronic control units corresponding to the same message ID are different.

Optionally, one clock unit may be one second, or the length of one clock unit may be set by a technician according to an actual need. This embodiment will not describe this in detail here.

Optionally, the sending time configuration information corresponding to each electronic control unit may be pre-stored in each electronic control unit.

Optionally, the central control device may send the sending time configuration information corresponding to each electronic control unit to each electronic control unit, and each electronic control unit receives and stores the sending time configuration information corresponding to each electronic sending unit and sent by the central control device.

Optionally, the central control device multiplexes the clock calibration device.

Optionally, the central control device may be a specially-established device for receiving the sending time configuration information input by a technician and sending the information to the electronic control unit, and will not be specifically limited in this embodiment.

Step 204: sending, by the electronic control unit, the message to the CAN bus at an available sending time according to the sending time configuration information.

In this embodiment, different sending times are assigned to electronic control units corresponding to the same message ID, and when sending a message to the CAN bus, the electronic control units send the message to the CAN bus at an available sending time according to corresponding sending time configuration information, such that the time when these electronic control units send messages to the CAN bus is separated, which can prevent different electronic control units from simultaneously sending messages with the same message ID to the CAN bus.

In this embodiment, the sending time configuration information corresponding to the electronic control unit includes a time offset corresponding to the electronic control unit. Where the time offset corresponding to the electronic control unit refers to the time offset of a first available sending time when the electronic control unit sends the message to the CAN bus within one clock unit from a start time of the clock unit.

Correspondingly, the sending, by the electronic control unit, the message to the CAN bus at the available sending time according to the sending time configuration information, can be implemented specifically in the following manner:

When sending the message to the CAN bus, calculating, by the electronic control unit, the available sending time within a current clock unit according to a corresponding time offset; and sending the message to the CAN bus at the available sending time within the current clock unit.

Optionally, after obtaining the available sending time within the current clock unit, the message is sent to the CAN bus at a latest available sending time to improve communication efficiency.

For example, one clock unit may be one second, and the electronic control unit of a brake system in an unmanned system of an unmanned vehicle can send a message corresponding to a brake instruction to the CAN bus. The unmanned vehicle may also include a safety control system, the safety control system is used for controlling working states of other parts of the unmanned system, and can send the message corresponding to the brake instruction to the CAN bus when the other parts of the unmanned system seriously fail.

It is assumed that the time offset of the electronic control unit of the brake system is 10 milliseconds, the time offset of the electronic control unit of the safety control system is 20 milliseconds, and a fixed period for sending a message to the CAN bus by the electronic control unit of the brake system and the electronic control unit of the safety control system is 20 milliseconds. Then, the sending time of the electronic control unit of the brake system is the 10th millisecond, 30th millisecond and 50th millisecond per second; and the sending time of the electronic control unit of the safety control system is the 20th millisecond, 40th millisecond and 60th millisecond per second. If the current time is 12:25:15.17 of the day, the electronic control unit of the brake system can send a message to the CAN bus at 12:25:15.30, while the electronic control unit of the safety control system can send a message to the CAN bus at 12:25:15.20.

It is assumed that the time offset of the electronic control unit of the brake system can be 15 milliseconds, the time offset of the electronic control unit of the safety control system can be 5 milliseconds, and the fixed period for sending a message to the CAN bus by the electronic control unit of the brake system and the electronic control unit of the safety control system is 20 milliseconds. Then, the sending time of the electronic control unit of the brake system is the 15th millisecond, 35th millisecond and 55th millisecond per second; and the sending time of the electronic control unit of the safety control system is the 5th millisecond, 25th millisecond and the 45th millisecond per second. If the current time is 12:25:15.17 of the day, the electronic control unit of the brake system can send a message to the CAN bus at 12:25:15.35, while the electronic control unit of the safety control system can send a message to the CAN bus at 12:25:15.25.

This embodiment of the present disclosure involves configuring different sending times for any two different electronic control units corresponding to the same message ID in sending time configuration information of electronic control units; obtaining, by the electronic control units, corresponding sending time configuration information when sending messages to a CAN bus; and sending the messages to the CAN bus at available sending times according to the sending time configuration information so that the time for sending, by any two different electronic control units corresponding to the same message ID, messages to the CAN bus is separated, which can avoid the case that different electronic control units send messages with the same message ID to the CAN bus at the same time, and thus avoid the case in which message IDs of a plurality of messages on the CAN bus conflict, thereby avoiding a serious accident of an unmanned vehicle caused by control instructions such as a brake instruction and a parking instruction sent by an electronic control unit not being executed by the vehicle as the result of the conflict of the message IDs of the plurality of messages on the CAN bus, and improving the safety of an unmanned system.

Embodiment III

Figure 3:
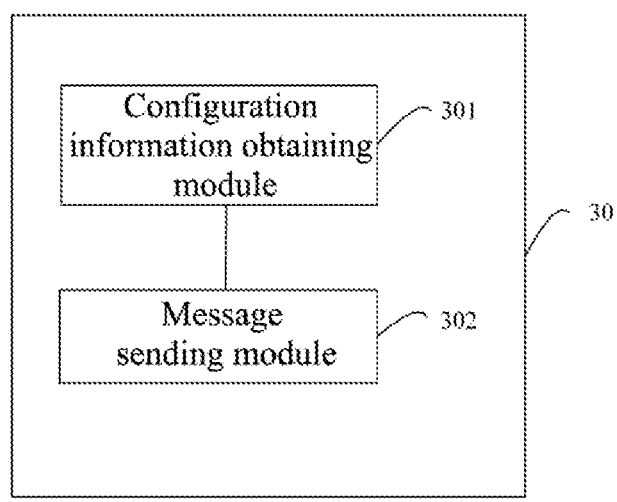
FIG. 3 is a schematic structural diagram of a message processing apparatus according to Embodiment III of the present disclosure.

FIG. 3 is a schematic structural diagram of a message processing apparatus according to Embodiment III of the present disclosure. The message processing apparatus provided by the embodiment of the present disclosure can perform a processing flow provided by the embodiment of the message processing method. As shown in FIG. 3, an apparatus 30 includes: a configuration information obtaining module 301 and a message sending module 302.

Specifically, the configuration information obtaining module 301 is configured to obtain, by an electronic control unit, corresponding sending time configuration information when sending a message to a CAN bus, and the sending time configuration information is used to determine an available sending time when the electronic control unit sends the message to the CAN bus. The available sending times when any two different electronic control units corresponding to the same message ID send messages to the CAN bus, are different.

The message sending module 302 is configured to send, by the electronic control unit, the message to the CAN bus at the available sending time according to the sending time configuration information.

The apparatus provided by this embodiment of the present disclosure may be specifically used to perform the method embodiment provided in the above Embodiment I, and specific functions will not be repeated here.

This embodiment of the present disclosure involves configuring different sending times for any two different electronic control units corresponding to the same message ID in sending time configuration information of electronic control units; obtaining, by the electronic control units, corresponding sending time configuration information when sending messages to a CAN bus; and sending the messages to the CAN bus at available sending times according to the sending time configuration information so that the time for sending, by any two different electronic control units corresponding to the same message ID, messages to the CAN bus is separated, which can avoid the case that different electronic control units send messages with the same message ID to the CAN bus at the same time, and thus avoid the case in which message IDs of a plurality of messages on the CAN bus conflict, thereby avoiding a serious accident of an unmanned vehicle caused by control instructions such as a brake instruction and a parking instruction sent by an electronic control unit not being executed by the vehicle as the result of the conflict of the message IDs of the plurality of messages on the CAN bus, and improving the safety of an unmanned system.

Embodiment IV

Figure 4:
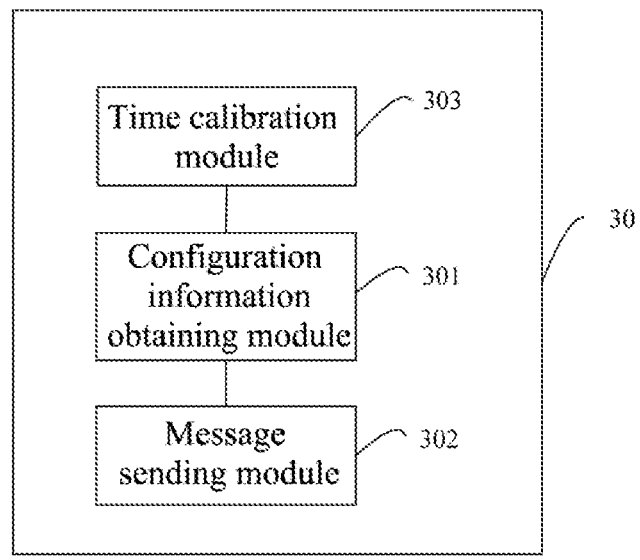
FIG. 4 is a schematic structural diagram of a message processing apparatus according to Embodiment IV of the present disclosure.

FIG. 4 is a schematic structural diagram of a message processing apparatus according to Embodiment IV of the present disclosure. On the basis of the above Embodiment III, in this embodiment, as shown in FIG. 4, the message processing apparatus 30 further includes a time calibration module 303.

The time calibration module 303 is configured to:
receive, by an electronic control unit, time calibration information sent by a clock calibration device; and calibrate, by the electronic control unit, local time according to the time calibration information.

Optionally, the time calibration information includes sending time stamp information. The time calibration module 303 is further configured to: calibrate, by the electronic control unit, the local time according to the sending time stamp information.

Optionally, the sending time configuration information corresponding to the electronic control unit includes a time offset corresponding to the electronic control unit, and the time offset corresponding to the electronic control unit refers to the time offset of a first available sending time when the electronic control unit sends the message to the CAN bus within one clock unit from a start time of the clock unit. The time offsets corresponding to any two different electronic control units corresponding to the same message ID are different.

Optionally, the message sending module is further configured to:
calculate, by the electronic control unit, an available sending time within a current clock unit according to a corresponding time offset when sending the message to the CAN bus; and send the message to the CAN bus at the available sending time within the current clock unit.

Optionally, the message sending module is further configured to:
send a message to the CAN bus at a next available sending time within the current clock unit.

Optionally, the configuration information obtaining module is further configured to:
receive, by the electronic control unit, the sending time configuration information that corresponds to the electronic control unit and is sent by a central control device, and store the sending time configuration information corresponding to the electronic control unit.

Optionally, the sending time configuration information corresponding to a plurality of electronic control units corresponding to the same message ID is different.

Optionally, the central control device is a clock calibration device.

The apparatus provided by this embodiment of the present disclosure may be specifically configured to perform the method embodiment provided in the above Embodiment II, and the specific functions will not be repeated here.

This embodiment of the present disclosure, by configuring different sending times for any two different electronic control units corresponding to the same message ID in sending time configuration information of electronic control units; obtaining, by the electronic control units, corresponding sending time configuration information when sending messages to a CAN bus; and sending the messages to the CAN bus at available sending times according to the sending time configuration information so that the time for any two different electronic control units corresponding to the same message ID to send messages to the CAN bus is separated, can avoid the case that different electronic control units send messages with the same message ID to the CAN bus at the same time, thus avoid the case in which message IDs of a plurality of messages on the CAN bus conflict, thereby avoiding a serious accident of an unmanned vehicle caused by control instructions such as a brake instruction and a parking instruction sent by an electronic control unit not being executed by the vehicle as the result of the conflict of the message IDs of the plurality of messages on the CAN bus, and improving the safety of an unmanned system.

Embodiment V

Figure 5:
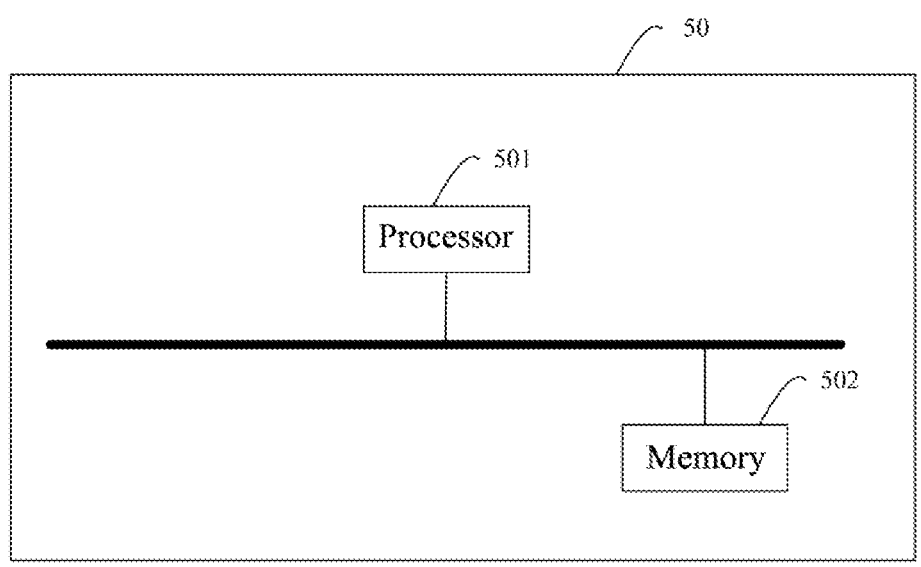
FIG. 5 is a schematic structural diagram of an electronic control unit according to Embodiment V of the present disclosure.

FIG. 5 is a schematic structural diagram of an electronic control unit according to Embodiment V of the present disclosure. As shown in FIG. 5, an electronic control unit 50 includes a processor 501, a memory 502, and a computer program stored on the memory 502 and executable by the processor 501.

The processor 501 implements the message processing method provided by any one of the above method embodiments when executing the computer program stored in the memory 502.

This embodiment of the present disclosure, by configuring different sending times for any two different electronic control units corresponding to the same message ID in sending time configuration information of electronic control units; obtaining, by the electronic control units, corresponding sending time configuration information when sending messages to a CAN bus; and sending the messages to the CAN bus at available sending times according to the sending time configuration information so that the time for any two different electronic control units corresponding to the same message ID to send messages to the CAN bus is separated, can avoid the case that different electronic control units send messages with the same message ID to the CAN bus at the same time, thus avoid the case in which message IDs of a plurality of messages on the CAN bus conflict, thereby avoiding a serious accident of an unmanned vehicle caused by control instructions such as a brake instruction and a parking instruction sent by an electronic control unit not being executed by the vehicle as the result of the conflict of the message IDs of the plurality of messages on the CAN bus, and improving the safety of an unmanned system.

In addition, an embodiment of the present disclosure further provides a computer readable storage medium storing a computer program, which, when being executed by a processor, implements the message processing method provided by any one of the above method embodiments.

In the several embodiments provided by the present disclosure, it should be understood that the disclosed apparatus and method may be implemented in other manners. For example, the apparatus embodiments described above are merely illustrative. For example, the division of an unit is only a logical function division, and there may be other division manner in an actual implementation, for example, multiple units or components may be combined with or integrated into another system, or some features can be ignored or not be executed. In addition, the mutual coupling or direct coupling or communication connection, as shown or discussed, may be an indirect coupling or communication connection through some interfaces, devices or units, and may be in an electrical, mechanical or other form.

The unit described as a separate component may or may not be physically separated, and the component displayed as a unit may or may not be a physical unit, that is, being located in one place, or being distributed to multiple network units. Some or all of the units may be selected as required, to achieve the purpose of the solution of the embodiment.

In addition, various functional units in each embodiment of the present disclosure may be integrated into one processing unit, or various units may physically exist individually, or two or more units may be integrated into one unit. The above integrated unit can be implemented in the form of hardware or in the form of hardware plus a software functional unit.

The integrated unit described above implemented in the form of a software functional unit can be stored in a computer readable storage medium. The above software functional unit is stored in a storage medium and includes a number of instructions for enabling a computer device (may be a personal computer, a server, or a network device, etc.) or a processor to perform part of the steps of the methods according to various embodiments of the present disclosure. The above storage medium includes media that can store a program code, such as a U disk, a mobile hard disk, a read-only memory (ROM), a random access memory (RAM), a magnetic disk, or an optical disk.

Those skilled in the art can clearly understand that only the division of functional modules described above is exemplified for the convenience and brevity of description. In a practical application, the above functions can be assigned to different functional modules as required, that is, an internal structure of the apparatus can be divided into different functional modules to perform all or part of the functions described above. The specific working process of the apparatus described above may refer to the corresponding process in the above method embodiment, and will not be repeated here.

Other embodiments of the present disclosure will be readily apparent to those skilled in the art after considering the specification and practicing the invention disclosed herein. The present disclosure is intended to cover any variations, uses, or adaptive changes of the present disclosure, and these variations, uses, or adaptive changes follow the general principles of the present disclosure and include common knowledge or conventional technical means in this technical field not disclosed by the present disclosure. The specification and embodiments are to be regarded as illustrative only, and the true scope and spirit of the present disclosure are subject to the claims below.

It will be understood that the present disclosure is not limited to a precise structure described above and shown in the attached drawings, and may be modified and changed in various ways without deviating from its scope. The scope of the present disclosure is only subject to the attached claims.

What is claimed is:

1. A message processing method, comprising:
   obtaining, by an electronic control unit, corresponding sending time configuration information when sending a message to a CAN bus, wherein the sending time configuration information is used to determine an available sending time when the electronic control unit sends the message to the CAN bus, and available sending times of any two different electronic control units, which correspond to the same message ID, are different when the two electronic control units send messages to the CAN bus; and
   sending, by the electronic control unit, the message to the CAN bus at the available sending time according to the sending time configuration information;
   wherein the sending time configuration information corresponding to the electronic control unit comprises a time offset corresponding to the electronic control unit, and the time offset corresponding to the electronic control unit refers to the time offset of a first available sending time when the electronic control unit sends the message to the CAN bus within one clock unit from a start time of the clock unit; and
   time offsets corresponding to any two different electronic control units corresponding to the same message ID are different.

2. The method of claim 1, wherein before the electronic control unit obtains the sending time configuration information before sending the message to the CAN bus, the method further comprises:
   receiving, by the electronic control unit, time calibration information sent by a clock calibration device;
   calibrating, by the electronic control unit, local time according to the time calibration information.

3. The method of claim 2, wherein the time calibration information comprises sending time stamp information,
   The calibrating, by the electronic control unit, local time according to the time calibration information, comprises:
   calibrating, by the electronic control unit, the local time according to the sending time stamp information.

4. The method of claim 1, wherein the sending, by the electronic control unit, the message to the CAN bus at the available sending time according to the sending time configuration information, comprises:
   calculating, by the electronic control unit, the available sending time within a current clock unit according to a corresponding time offset, when sending the message to the CAN bus; and
   sending the message to the CAN bus at the available sending time within the current clock unit.

5. The method of claim 4, wherein the sending the message to the CAN bus at the available sending time within the current clock unit, comprises:

sending the message to the CAN bus at a next available sending time available within the current clock unit.

6. The method of claim 1, wherein before the obtaining, by an electronic control unit, the sending time configuration information when sending a message to a CAN bus, the method further comprises:
receiving, by the electronic control unit, the sending time configuration information corresponding to the electronic control unit and sent by a central control device, and storing the sending time configuration information corresponding to the electronic control unit.

7. The method of claim 6 wherein the sending time configuration information corresponding to a plurality of electronic control units corresponding to the same message ID is different.

8. The method of claim 6, wherein the central control device is a clock calibration device.

9. A message processing apparatus, comprising: a memory, a processor, and a computer program stored on the memory and executable on the processor, wherein the computer program, when executed by the processor, causes the processor to:
obtain, by an electronic control unit, corresponding sending time configuration information when sending a message to a CAN bus, wherein the sending time configuration information is used to determine an available sending time when the electronic control unit sends the message to the CAN bus, and available sending times of any two different electronic control units, which correspond to the same message ID, are different when the two electronic control units send messages to the CAN bus; and
send, by the electronic control unit, the message to the CAN bus at the available sending time according to the sending time configuration information;
wherein the sending time configuration information corresponding to the electronic control unit comprises a time offset corresponding to the electronic control unit, and the time offset corresponding to the electronic control unit refers to the time offset of a first available sending time when the electronic control unit sends the message to the CAN bus within one clock unit from a start time of the clock unit; and
time offsets corresponding to any two different electronic control units corresponding to the same message ID are different.

10. The apparatus of claim 9, wherein the computer program further causes the processor to:
receive, by the electronic control unit, time calibration information sent by a clock calibration device; and
calibrate, by the electronic control unit, local time according to the time calibration information.

11. The apparatus of claim 10, wherein the time calibration information comprises sending time stamp information, and the computer program further causes the processor to:
calibrate, by the electronic control unit, the local time according to the sending time stamp information.

12. The apparatus of claim 9, wherein the computer program further causes the processor to:
calculate, by the electronic control unit, an available sending time within a current clock unit according to a corresponding time offset, when sending the message to the CAN bus; and
send the message to the CAN bus at the available sending time within the current clock unit.

13. The apparatus of claim 12, wherein the computer program further causes the processor to:
send a message to the CAN bus at a next available sending time within the current clock unit.

14. The apparatus according to claim 9, wherein the computer program further causes the processor to:
receive, by the electronic control unit, the sending time configuration information corresponding to the electronic control unit and sent by a central control device, and store the sending time configuration information corresponding to the electronic control unit.

15. The apparatus of claim 14, wherein the sending time configuration information corresponding to a plurality of electronic control units corresponding to the same message ID is different.

16. The apparatus of claim 15, wherein the central control device is a clock calibration device.

17. An electronic control unit, comprising:
a memory, a processor, and a computer program stored on the memory and executable on the processor,
the method according to claim 1 is implemented when the processor runs the computer program.

18. A computer readable storage medium, storing a computer program, which, when being executed by a processor, implements the method according to claim 1.

* * * * *